(12) United States Patent
Yao et al.

(10) Patent No.: US 12,348,130 B2
(45) Date of Patent: Jul. 1, 2025

(54) EMI NOISE REDUCTION CIRCUIT FOR DC/DC CONVERTER

(71) Applicant: General Electric Company, Schenectady, NY (US)

(72) Inventors: Gang Yao, Mason, OH (US); Ramanujam Ramabhadran, Bohemia, NY (US); Cong Li, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 961 days.

(21) Appl. No.: 17/474,623

(22) Filed: Sep. 14, 2021

(65) Prior Publication Data
US 2024/0372464 A1  Nov. 7, 2024

(51) Int. Cl.
*H02M 1/44* (2007.01)
*H02J 7/00* (2006.01)

(52) U.S. Cl.
CPC ............ *H02M 1/44* (2013.01); *H02J 7/0029* (2013.01); *H02J 2207/20* (2020.01); *H02J 2310/44* (2020.01)

(58) Field of Classification Search
CPC ......... H02M 1/44; H02M 1/123; H02M 3/158
See application file for complete search history.

(56) References Cited

U.S. PATENT DOCUMENTS

| | | | |
|---|---|---|---|
| 8,030,788 B2 | 10/2011 | Xu et al. | |
| 9,768,680 B2 | 9/2017 | Bojarski et al. | |
| 9,973,097 B2 | 5/2018 | Wambsganss | |
| 10,069,406 B2 | 9/2018 | Huang et al. | |
| 10,293,694 B2 | 5/2019 | Rouille | |
| 10,978,948 B2 | 4/2021 | Du et al. | |

(Continued)

FOREIGN PATENT DOCUMENTS

| | | |
|---|---|---|
| CN | 104113214 A | 10/2014 |
| CN | 206251047 U | 6/2017 |

OTHER PUBLICATIONS

Saponara Sergio etal: "Improving electromagnetic compatibility of integrated switching converters for hybrid/electric vehicles", 2016 IEEE Electric Power and Energy Conference (EPEC), IEEE, Oct. 12, 2016 (Oct. 12, 2016). pp. 1-6, XP033017550, DOI: 10.1109/EPEC.20167771733 [retrieved on Dec. 5, 2016] (Year: 2016).*

(Continued)

*Primary Examiner* — Adolf D Berhane
*Assistant Examiner* — Afework S Demisse
(74) *Attorney, Agent, or Firm* — Dority & Manning, P.A.

(57) ABSTRACT

A power system is provided. The power system includes a multi-level DC/DC converter electrically coupled with a terminal of a voltage source, such as a battery. The power system includes an EMI filter network having EMI shunt filters electrically coupled between the terminals of the battery and a reference frame or grounding system. The EMI shunt filters each include at least one of a first order filter and a second order filter. The elements of these ordered filters can be used to shunt common mode electric current to less-resistive paths, limit voltage, and reduce common mode voltage noise to ultimately reduce the common mode effects in the power system.

19 Claims, 8 Drawing Sheets

(56) References Cited

U.S. PATENT DOCUMENTS

2014/0111176 A1    4/2014  Nishimura
2022/0103086 A1*  3/2022  Liu .................... H02M 1/32

OTHER PUBLICATIONS

Kalnoskas, "How to design modular DC-DC systems, Part 2: Filter design", Power Conversion Tutorial Series, Oct. 6, 2020, Retrieved from: https://www.powerelectronictips.com/how-to-design-modular-dc-dc-systems-part-2-filter-design-faq/.

Mortenson et al., "An Active Common Mode EMI Filter for Switching Converters", Industry Applications Society Annual Meeting, IAS '08, IEEE, pp. 1-8.

Saponara et al., "Improving Electromagnetic Compatibility of Integrated Switching Converters for Hybrid/electric Vehicles", 2016 IEEE Electrical Power And Energy Conference (EPEC), Oct. 12, 2016, pp. 1-6.

Vicor, "DCM Design Guide", 99 Pages, Retrieved from: https://www.vicorpower.com/documents/design_guides/DG-DCM-Design-Guide-VICOR.pdf.

Brovont et al., "Modeling common-mode circulating currents in paralleled non-isolated DC-DC converter-based systems", IEEE Energy Conversion Congress and Exposition (ECCE), IEEE, Sep. 23, 2018, pp. 4187-4194.

* cited by examiner

EMI NOISE REDUCTION CIRCUIT FOR DC/DC CONVERTER

FIELD

The present subject matter relates generally to electrical power systems, such as electrical power systems for aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing separated from the wing and fuselage.

Electric and hybrid-electric propulsion systems are being developed to improve an efficiency of conventional commercial aircraft. Such propulsion systems can include a battery system for providing electrical power to various loads, such as one or more electric machines operable to drive one or more propulsors, such as fans. DC/DC converters can be used to regulate the voltage of the direct current provided by the battery system. Reducing common mode emissions associated with such DC/CD converters has presented certain challenges. Accordingly, a system designed to reduce common mode emissions would be a welcome addition to the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Electrical power systems, such as those found in aircraft hybrid-electric and electric propulsion systems, can include a battery and a power converter electrically connected thereto. Due to ever increasing requirements for aviation electrical power systems to increase power distribution voltage, increase power level and consequent emission paths, and use of efficient high-speed power semiconductors, there is an increased need for mitigation of common mode emissions. Common mode emissions may introduce voltage stresses and parasitic current via electromechanical interfaces. Accordingly, the inventors of the present disclosure have developed power system architectures and control schemes that may reduce common mode emissions and associated electromagnetic interference in electrical power systems having a battery and a power converter electrically coupled thereto.

In one example aspect, a power system is provided. The power system includes a multi-level DC/DC converter electrically coupled with a terminal of a voltage source, such as a battery. Such a multi-level DC/DC converter can be a source of common mode emission noise in the power system. To reduce the common mode noise in the system, the power system includes an EMI filter network having EMI shunt filters electrically coupled between the terminals of the battery and a reference frame or grounding system. The EMI shunt filters each include at least one of a first order filter and a second order filter. The elements of these ordered filters can be used to shunt common mode electric current to less-resistive paths, limit voltage, and reduce common mode voltage noise to ultimately reduce the common mode effects in the power system.

The power systems provided herein may provide certain advantages and benefits. For instance, as noted above, such power systems can reduce common mode voltage/current noise in the system. Moreover, such power systems can eliminate or greatly reduce the need for heavy common mode inductors configured in a common mode choke configuration, thus providing weight performance benefits. In addition, such power systems can eliminate or greatly reduce the need for split DC link DC/DC converter configurations. While such split DC link DC/DC converter configurations can contain common mode noise locally, they may introduce significant current stresses. The power systems of the present disclosure may advantageously contain common mode noise locally without introducing significant current stresses. The power systems provided herein may provide other advantages and benefits not expressly noted herein.

Figure 1:
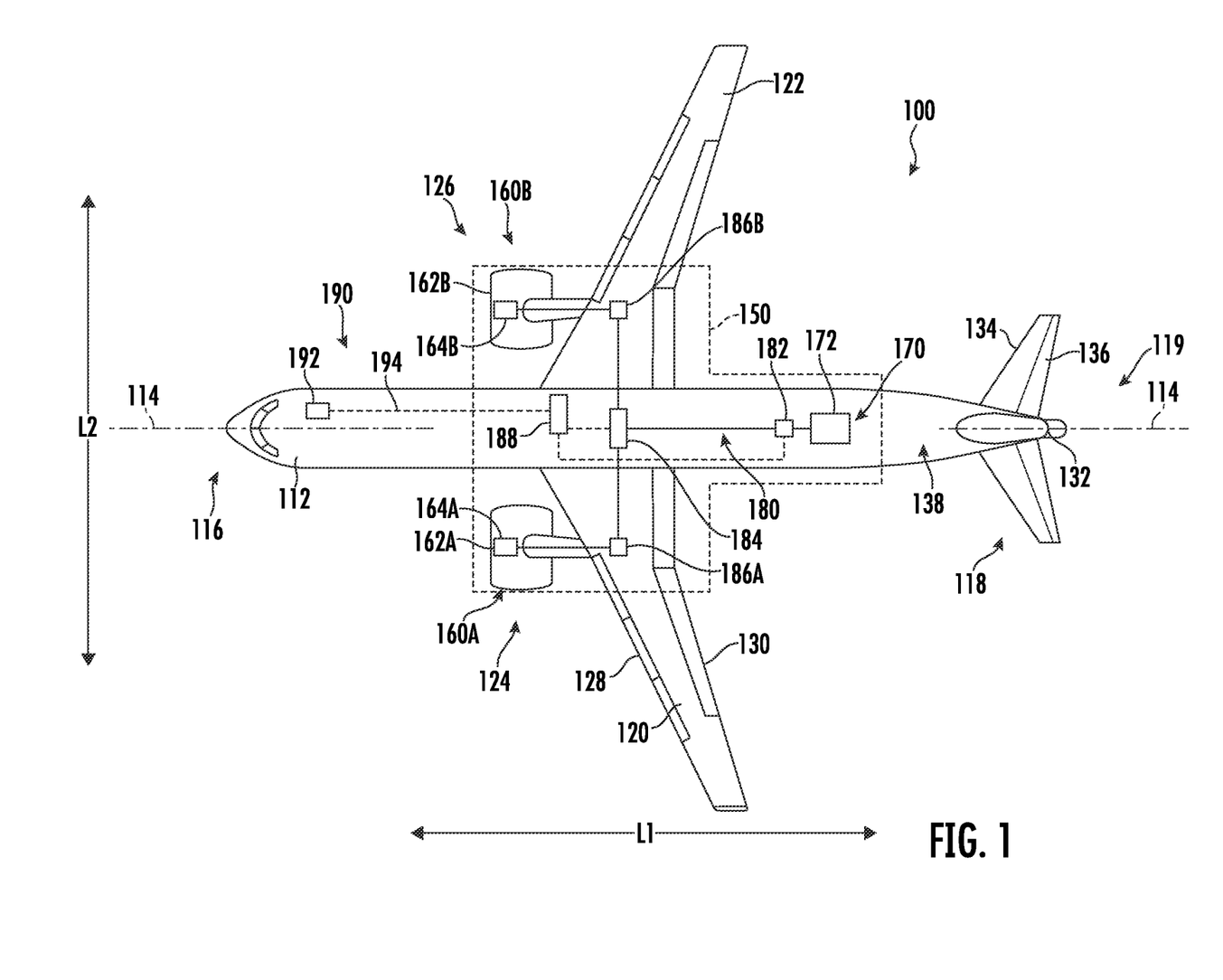
FIG. 1 provides a schematic top view of an aircraft having a hybrid-electric propulsion system according to various exemplary embodiments of the present disclosure.

FIG. 1 provides a schematic top view of an exemplary aircraft 100 as may incorporate one or more inventive aspects of the present disclosure. As shown in FIG. 1, for reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1. The aircraft 100 extends between a forward end 116 and an aft end 118, e.g., along the longitudinal direction L1.

As depicted, the aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that, in other exemplary embodiments of the present disclosure, the aircraft 100 may additionally or alternatively include any other suitable configuration. For example, in other embodiments, the aircraft 100 may include any other control surface configuration.

The exemplary aircraft 100 of FIG. 1 also includes a hybrid-electric propulsion system 150. For this embodiment, the hybrid-electric propulsion system 150 has a first propulsor 160A and a second propulsor 160B both operable to produce thrust. The first propulsor 160A is mounted to the first wing 120 and the second propulsor 160B is mounted to the second wing 122. Moreover, for the embodiment depicted, the first propulsor 160A and second propulsor 160B are each configured in an underwing-mounted configuration. However, in other example embodiments, one or both of the first and second propulsors 160A, 160B may be mounted at any other suitable location in other exemplary embodiments.

The first propulsor 160A includes a first gas turbine engine 162A and one or more electric machines, such as a first electric machine 164A mechanically coupled with the gas turbine engine 162A. The first electric machine 164A can be directly mechanically coupled to a shaft of the first gas turbine engine 162A or indirectly via a gearbox, for example. The first electric machine 164A can be an electric generator, an electric motor, or a combination generator/motor. For this example embodiment, the first electric machine 164A is a combination generator/motor. In this manner, when operating as an electric generator, the first electric machine 164A can generate electrical power when driven by the gas turbine engine 162A. When operating as an electric motor, the first electric machine 164A can drive or motor the first gas turbine engine 162A. The first gas turbine engine 162A can be any suitable type of gas turbine engine, including a turbofan, turbojet, turboprop, turboshaft, etc.

Likewise, the second propulsor 160B includes a second gas turbine engine 162B and one or more electric machines, such as a second electric machine 164B mechanically coupled with the second gas turbine engine 162B. The second electric machine 164B can be directly mechanically coupled to a shaft of the second gas turbine engine 162B or indirectly via a gearbox, for example. The second electric machine 164B can be an electric generator, an electric motor, or a combination generator/motor. For this example embodiment, the second electric machine 164B is a combination generator/motor. In this manner, when operating as an electric generator, the second electric machine 164B can generate electrical power when driven by the gas turbine engine 162B. When operating as an electric motor, the second electric machine 164B can drive or motor a spool of the gas turbine engine 162B. The second electric machine 164B can be configured and can operate in a similar manner as first electric machine 164A described herein. The second gas turbine engine 162B can be any suitable type of gas turbine engine, including a turbofan, turbojet, turboprop, turboshaft, etc.

The hybrid-electric propulsion system 150 further includes an electric energy storage system 170. The electric energy storage system 170 can include one or more electric energy storage devices, such as batteries, supercapacitor arrays, one or more ultracapacitor arrays, some combination of the foregoing, etc. For instance, for this embodiment, the electric energy storage system 170 includes a battery 172.

The battery 172 is electrically coupled with a DC/DC converter 182 or voltage-regulating power supply. In some embodiments, the DC/DC converter 182 can be a bidirectional DC/DC converter. In this regard, the DC/DC converter 182 can control the electrical power drawn from the battery 172 and the electrical power provided to the battery 172 depending on whether it is desired to discharge or charge the battery 172. The DC/DC converter 182 is electrically coupled with a power bus 180.

A power distribution unit 184 is positioned along the power bus 180. The power distribution unit 184 can be controlled to distribute electrical power to various loads of the aircraft 100. For instance, electrical power drawn from the battery 172 can be directed to the power distribution unit 184 across the power bus 180, and the power distribution unit 184 can distribute the electrical power to various aircraft loads, such as the first electric machine 164A and/or the second electric machine 164B. A first AC/DC converter 186A (or first DC/AC converter) associated with the first electric machine 164A can be positioned along the power bus 180 for converting direct current into alternating current or vice versa. Similarly, a second AC/DC converter 186B (or second DC/AC converter) associated with the second electric machine 164B can be positioned along the power bus 180 for converting direct current into alternating current or vice versa. The first AC/DC converter 186A and the second AC/DC converter 186B can both be bidirectional converters.

The power distribution unit 184 and other controllable electrical elements of the hybrid-electric propulsion system 150 can be managed by a power management system. The power management system can include a supervisor controller 188 operable to control or provide data to the power distribution unit 184 and the DC/DC converter 182, among other elements. The DC/DC converter 182 can include a controller operable to receive inputs from the supervisor controller 188, and based on such inputs, the controller can cause the switching elements of the DC/DC converter 182 to perform a duty cycle, for example.

As further shown in FIG. 1, the supervisor controller 188 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes the supervisor controller 188 as well as other computing devices, such as computing device 192. The computing system 190 can include other computing devices as well, such as engine controllers (not shown). The computing devices of the computing system 190 can be communicatively coupled with one another via a communication network. For instance, computing device 192 is located in the cockpit of the aircraft 100 and is communicatively coupled with the supervisor controller 188 of the hybrid-electric propulsion system 150 via a communication link 194 of the communication network. The communication link 194 can include one or more wired or wireless communication links.

For this embodiment, the computing device 192 is configured to receive and process inputs, e.g., from a pilot or other crew members, and/or other information. In this manner, as one example, the one or more processors of the computing device 192 can receive an input indicating a command to change a thrust output of the first and/or second propulsors 160A, 160B. In response to the input, the supervisor controller 188 can manage the electrical power drawn from the battery 172 by controlling or providing data to the controller of the DC/DC converter 182, as well as managing the power distribution unit 184 and AC/DC converters 186A, 186B to distribute and supply the electrical power needed to meet the power demands of the electric machines 164A, 164B. In this way, the electric machines 164A, 164B can drive their respective gas turbine engines 162A, 162B to ultimately change the thrust output of one or both of the propulsors 160A, 160B.

The supervisor controller 188 and other computing devices of the computing system 190 of the aircraft 100 may be configured in the same or substantially the same manner as the exemplary computing devices of the computing system 800 described below with reference to FIG. 8.

While the aircraft 100 depicted in FIG. 1 includes the hybrid-electric propulsion system 150, it will be appreciated that the inventive aspects of the present disclosure can apply equally to fully electric propulsion systems. Moreover, the inventive aspects of the present disclosure can apply to other electrical power systems outside of the aviation industry that include a voltage source, such as a battery, and a power converter supply electrically coupled thereto.

Figure 2:
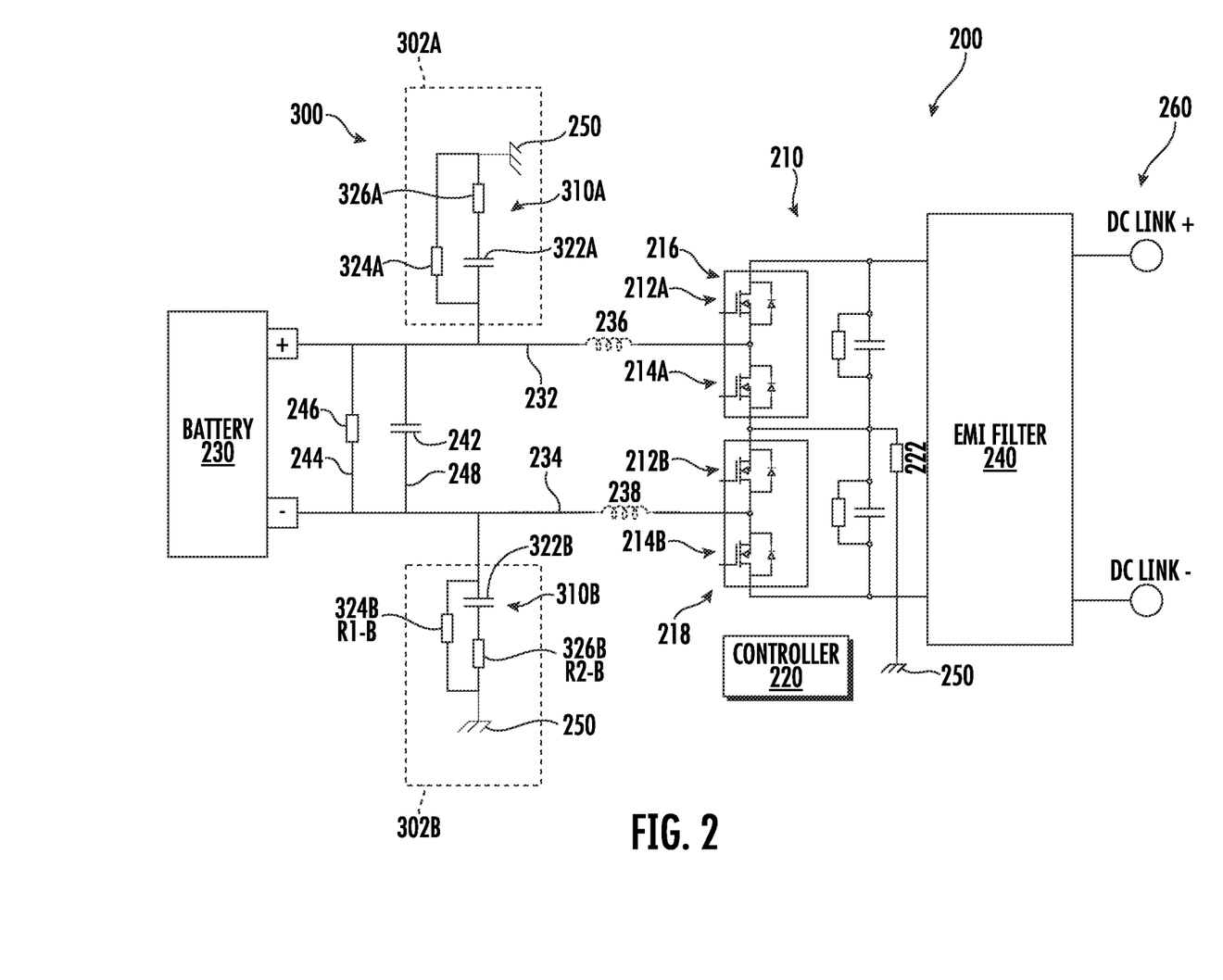
FIG. 2 provides a system diagram of an example power system according to one exemplary embodiment of the present disclosure.

FIG. 2 provides a system diagram depicting a power system 200 according to one exemplary embodiment of the present disclosure. The power system 200 of FIG. 2 can be incorporated into the hybrid-electric propulsion system 150 of the aircraft 100 of FIG. 1 or into some other suitable application.

As depicted, the power system 200 includes a DC/DC converter 210, which in this example embodiment is a multi-level DC/DC converter 210. Further, for this embodiment, the DC/DC converter 210 is a non-split link multi-level DC/DC converter. The multi-level DC/DC converter 210 can be a unidirectional or bidirectional power converter.

The power system 200 also includes a battery 230. The battery 230 has a first terminal 232 and a second terminal 234. In this example embodiment, the first terminal 232 is the positive terminal and the second terminal 234 is the negative terminal of the battery 230. The DC/DC converter 210 is electrically coupled with the battery 230. Particularly, the DC/DC converter 210 is electrically coupled with the first terminal 232 and the second terminal 234 of the battery 230.

For this embodiment, a first terminal inductor 236 is positioned along the first terminal 232 and a second terminal inductor 238 is positioned along the second terminal 234. Moreover, a first terminal connection link 248 electrically couples the first terminal 232 and the second terminal 234. A terminal capacitor 242 is positioned along the first terminal connection link 248. Further, a second terminal connection link 244 electrically couples the first terminal 232 and the second terminal 234. A terminal resistor 246 is positioned along the second terminal connection link 244. The terminal capacitor 242 is arranged in parallel with the terminal resistor 246.

The DC/DC converter 210 includes a plurality of switching devices. More specifically, for this embodiment, the DC/DC converter 210 includes high side switching devices 212A (represented schematically by a single switching device in FIG. 2) and low side switching devices 214A (represented schematically by a single switching device in FIG. 2) associated with a first side 216 of the DC/DC converter 210. The DC/DC converter 210 also includes high side switching devices 212B (represented schematically by a single switching device in FIG. 2) and low side switching devices 214B (represented schematically by a single switching device in FIG. 2) associated with a second side 218 of the DC/DC converter 210. The switching devices of the DC/DC converter 210 can be any suitable type of switching devices or elements, such as insulated gate bipolar transistors, power MOSFETs, etc.

The switching devices of the DC/DC converter 210 can be switched or modulated by one or more controllable devices to regulate the electrical power drawn from or provided to the battery 230. For instance, the switching devices of the DC/DC converter 210 can be controlled by one or more associated gate drivers (not shown in FIG. 2). The one or more gate drivers can be controlled to drive or modulate their respective switching devices. In some embodiments, each switching device of the DC/DC converter 210 has an associated gate driver. In other embodiments, multiple switching devices of the DC/DC converter 210 can be driven by a single gate driver. By turning on or off the switching devices of the DC/DC converter 210, electrical power provided or drawn from the battery 230 can be controlled.

The DC/DC converter 210 can also include one or more sensors. The sensors can sense various characteristics or properties of the electrical power at certain locations within the DC/DC converter 210. For instance, the DC/DC converter 210 can include one or more sensors operable to measure a voltage at their respective locations. Moreover, the DC/DC converter 210 can include one or more sensors operable to measure an electric current at their respective locations.

The DC/DC converter 210 can include one or more processors and one or more memory devices. The one or more processors and one or more memory devices can be embodied in one or more controllers or computing devices. For instance, for this embodiment, the one or more processors and one or more memory devices are embodied in a controller 220. The controller 220 can be communicatively coupled with various devices, such as the gate drivers associated with the switching devices of the DC/DC converter 210, the one or more sensors, other computing devices (such as the supervisor controller 188 depicted in FIG. 1), as well as other electronic devices. The controller 220 can be communicatively coupled with such devices via a suitable wired and/or wireless connection. Generally, the controller 220 can be configured in the same or substantially the same manner as the exemplary computing devices of the computing system 800 described with reference to FIG. 8.

The DC/DC converter 210 has an associated EMI filter 240, or electromagnetic interference filter. The positive and negative rails of the DC/DC converter 210 are shown passing through the EMI filter 240. Generally, the EMI filter 240 can suppress electromagnetic noise. A mid rail of the DC/DC converter 210 can be connected to a reference frame 250 or grounding system. The reference frame 250 can be a chassis, frame, heat sink, cabinet, or other enclosure, for example. A mid resistor 222 is positioned along the mid rail of the DC/DC converter 210.

The DC/DC converter 210 is electrically coupled to a power bus 260, as represented by the positive DC link and the negative DC link in FIG. 2. Electrical power can be transmitted along the power bus 260 from one or more loads to the battery 230 (i.e., in a charging mode) or electrical power can be transmitted along the power bus 260 from the battery 230 to the one or more loads (i.e., in a discharging mode). The one or more loads can include any combination of aircraft loads, including, for example, the electric machines 164A, 164B depicted in FIG. 1.

As further shown in FIG. 2, the power system 200 includes an EMI shunt filter network 300. The EMI shunt filter network 300 includes one or more EMI shunt filters. For instance, for the illustrated embodiment of FIG. 2, the EMI shunt filter network 300 includes a first EMI shunt filter 302A and a second EMI shunt filter 302B. Generally, the first and second EMI shunt filters 302A, 302B are electrically coupled with the first and second terminals 232, 234 of the battery 230 to reduce the common mode voltage noise in the power system 200. Particularly, as shown, the first EMI shunt filter 302A is electrically coupled between the first terminal 232 of the battery 230 and the reference frame 250. The second EMI shunt filter 302B is electrically coupled between the second terminal 234 of the battery 230 and the reference frame 250.

For this embodiment, the first EMI shunt filter 302A includes a first order filter 310A. As used herein, a first order filter is a first order circuit that includes a single energy storage element, such as a capacitor or an inductor, and at least one resistor. For the depicted embodiment of FIG. 2, the first order filter 310A includes a capacitor 322A, a first resistor 324A arranged in parallel with the capacitor 322A, and a second resistor 326A arranged in series with the capacitor 322A and in parallel with the first resistor 324A. Thus, for this embodiment, the first order filter 310A is an RCR circuit. In some embodiments, the first resistor 324A has a first resistance R1 and the second resistor 326A has a second resistance R2, the first resistance R1 being different than the second resistance R2. Further, in some embodiments, the second resistance R2 is lower than the first resistance R1. In this regard, in such embodiments, the first resistor 324A has a higher resistance than the second resistor 326A. As one example the first resistance R1 can be hundreds or in triple digits of ohms while the second resistance R2 can be in single or double digits of ohms.

The second EMI shunt filter 302B is configured in a similar manner as the first EMI shunt filter 302A. Specifically, the second EMI shunt filter 302B includes a first order filter 310B. For this embodiment, the first order filter 310B includes a capacitor 322B, a first resistor 324B arranged in parallel with the capacitor 322B, and a second resistor 326B arranged in series with the capacitor 322B and in parallel with the first resistor 324B. Thus, for this embodiment, the first order filter 310B is an RCR circuit. In some embodiments, the first resistor 324B has a first resistance R1-B and the second resistor 326B has a second resistance R2-B, the first resistance R1-B being different than the second resistance R2-B. Further, in some embodiments, the second resistance R2-B is lower than the first resistance R1-B. Thus, in such embodiments, the first resistor 324B has a higher resistance than the second resistor 326B. As one example the first resistance R1-B can be hundreds or in triple digits of ohms while the second resistance R2-B can be in single or double digits of ohms.

The resistances of the resistors 324A, 324B, 326A, 326B and the capacitance of the capacitors 322A, 322B can be selected to specify or define damping the EMI shunt filter provides as well as a cutoff frequency. A cutoff frequency is a frequency at which the capacitors 322A, 322B "kick in" to shunt common mode currents. While the resistors 324A, 324B, 326A, 326B all shunt electric current at all frequencies, at the cutoff frequency, the capacitors 322A, 322B essentially become shorts. Thus, the EMI filters essentially become parallel resistor circuits. This provides damped, well-behaved shunting of common mode currents at high frequencies, which is where most common mode currents typically occur. Well-behaved shunting of common mode currents prevents common mode currents from going to the battery 230.

Generally, at lower switching frequencies, or rather frequencies below the cutoff frequency, the first resistor 324A and the capacitor 322A work together to shunt common mode currents and the first resistor 324B and the capacitor 322B work together to shunt common mode currents. At higher switching frequencies, or rather frequencies above the cutoff frequency, the capacitor 322A and the second resistor 326A work together and the capacitor 322B and the second resistor 326B work together to provide enhanced shunting of common mode currents. In this regard, the EMI shunt filter network 300 presents a relatively low impedance at relatively higher frequencies so that there is only a small high frequency ripple common mode voltage between the first and second terminals 232, 234 and the reference frame 250, which ultimately reduces EMI.

Accordingly, the architecture of the EMI shunt filter network 300 may advantageously reduce the common mode voltage noise in the power system 200. Particularly, the first EMI shunt filter 302A may contain common mode noise locally with respect to the first terminal 232 and may also reduce the radiated emission energy. Similarly, the second EMI shunt filter 302B may contain common mode noise locally with respect to the second terminal 234 and may also reduce the radiated emission energy. The architecture of the EMI shunt filter network 300 may further provide flexibility to optimize the system EMI design and achieve optimal power system weight performance. System weight performance may be reduced as features of conventional architectures, such as a common mode choke or split DC link DC/DC converter configurations, may not or are not needed to mitigate common mode emissions.

Figure 3:
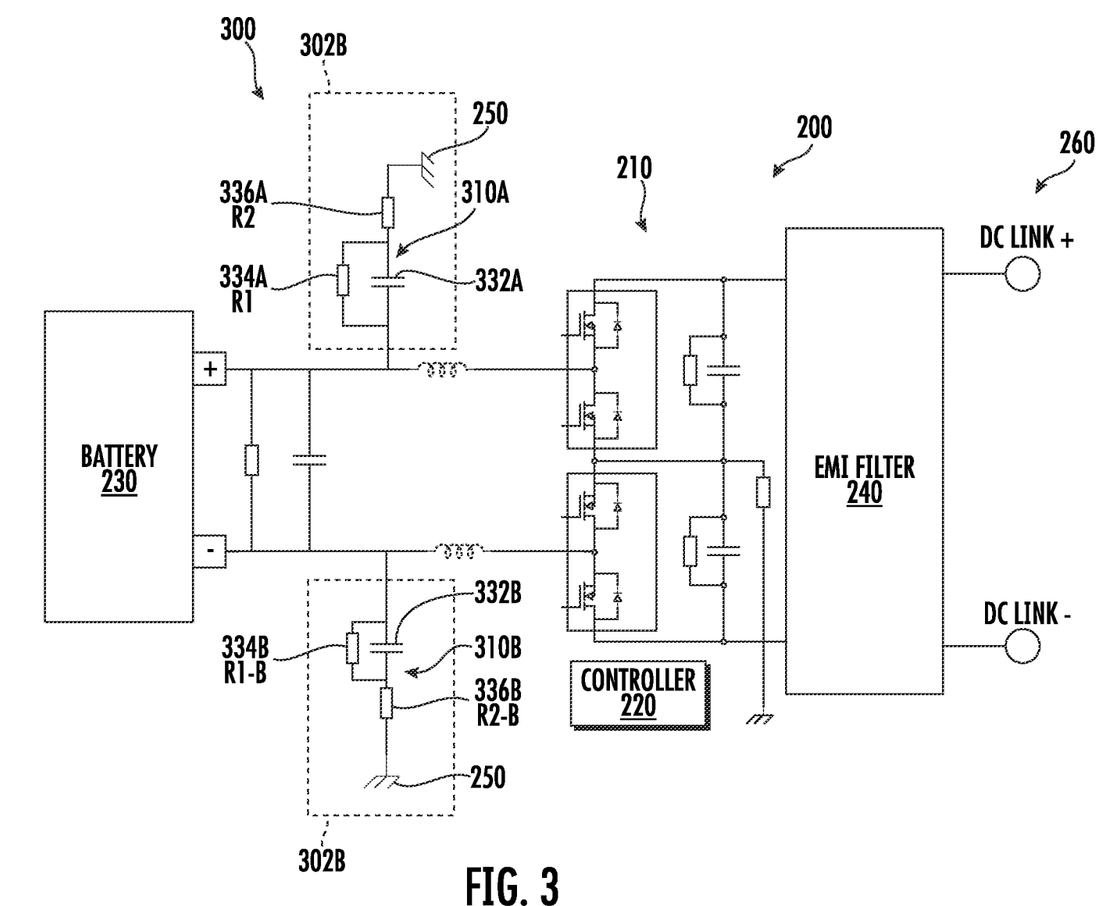
FIG. 3 provides a system diagram of an example power system according to another exemplary embodiment of the present disclosure.

FIG. 3 provides a system diagram of a power system 200 according to another exemplary embodiment of the present disclosure. The power system 200 of FIG. 3 is configured in the same manner as the power system 200 of FIG. 2 except as provided below.

As depicted in FIG. 3, for this embodiment, the first EMI shunt filter 302A includes a first order filter 310A. The first order filter 310A includes a capacitor 332A, a first resistor 334A arranged in parallel with the capacitor 332A, and a second resistor 336A arranged in series with the capacitor 332A and in series with the first resistor 334A. In some embodiments, the first resistor 334A has a first resistance R1 and the second resistor 336A has a second resistance R2, the first resistance R1 being different than the second resistance R2. Further, in some embodiments, the second resistance R2 is lower than the first resistance R1. In this regard, in such embodiments, the first resistor 334A has a higher resistance than the second resistor 336A.

The second EMI shunt filter 302B is configured in a similar manner as the first EMI shunt filter 302A in the EMI filter network of FIG. 3. Specifically, the second EMI shunt filter 302B includes a first order filter 310B. The first order filter 310B includes a capacitor 332B, a first resistor 334B arranged in parallel with the capacitor 332B, and a second resistor 336B arranged in series with the capacitor 332B and in series with the first resistor 334B. In some embodiments, the first resistor 334B has a first resistance R1-B and the second resistor 336B has a second resistance R2-B, the first resistance R1-B being different than the second resistance R2-B. Further, in some embodiments, the second resistance R2-B is lower than the first resistance R1-B. Thus, in such embodiments, the first resistor 334B has a higher resistance than the second resistor 336B.

Generally, at lower switching frequencies, or rather frequencies below the cutoff frequency typically defined by the capacitance of the capacitors 332A, 332B, common mode currents are shunted by the first resistor 334A and the second resistor 336A for the first EMI shunt filter 302A and by the first resistor 334B and the second resistor 336B for the second EMI shunt filter 302B. The relatively high impedance offered by the series resistors may increase system performance as electric current from the battery 230 is more efficiently provided to the DC/DC converter 210, or vice versa. At higher frequencies, or rather frequencies above the cutoff frequency, the capacitors 332A, 332B "kick in" or short. This causes electric current to bypass the first resistors 334A, 334B, leaving the second resistors 336A, 336B as the impedance elements to shunt common mode currents away from the battery 230. Thus, increased shunting can be provided at higher frequencies. In this regard, the EMI shunt filter network 300 presents a relatively low impedance path at relatively higher frequencies so that there is only a small high frequency ripple common mode voltage between the first and second terminals 232, 234 and the reference frame 250, which ultimately reduces EMI.

Figure 4:
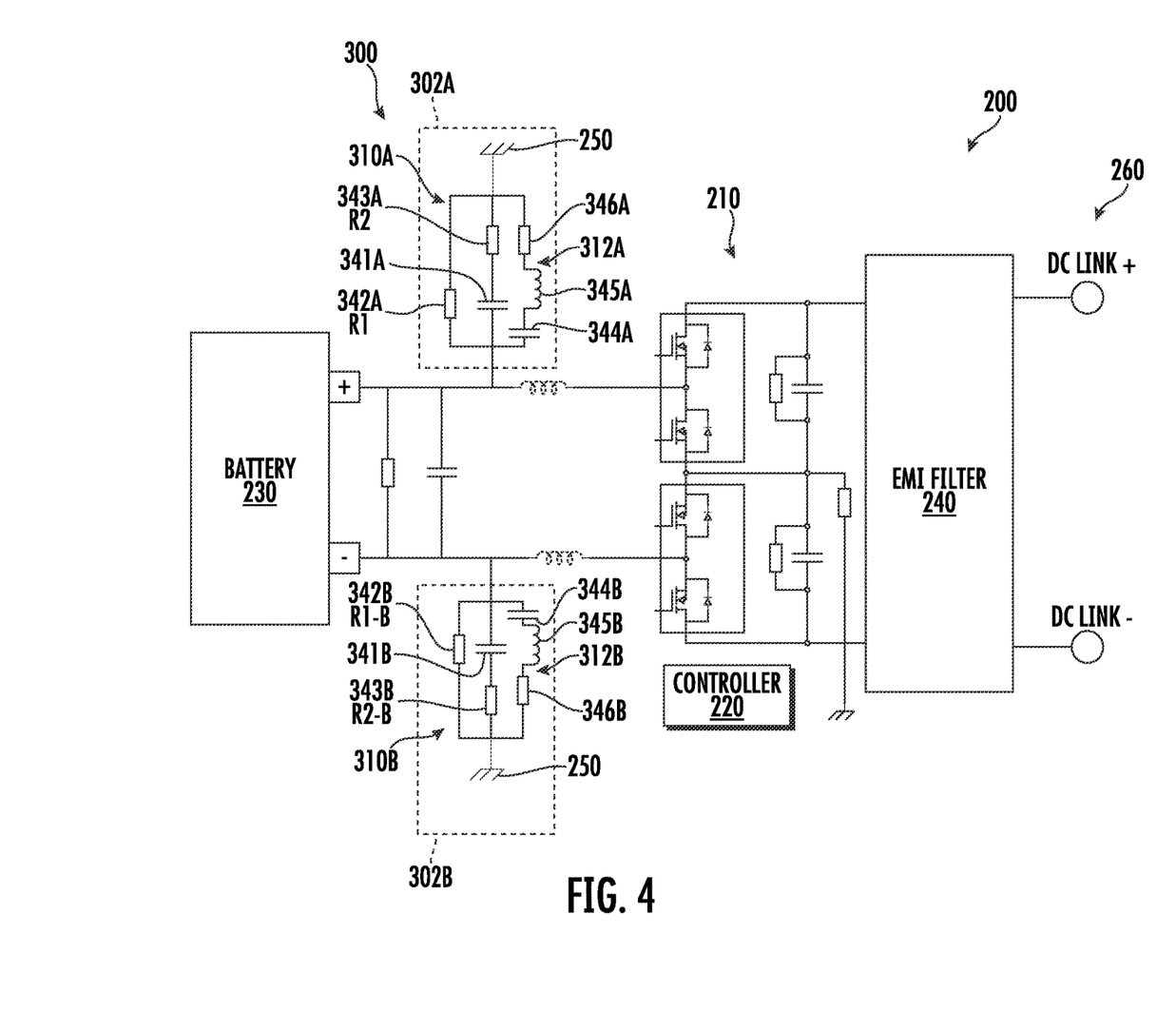
FIG. 4 provides a system diagram of an example power system according to a further exemplary embodiment of the present disclosure.

FIG. 4 provides a system diagram of a power system 200 according to another exemplary embodiment of the present disclosure. The power system 200 of FIG. 4 is configured in the same manner as the power system 200 of FIG. 2 except as provided below.

As depicted in FIG. 4, for this embodiment, the first EMI shunt filter 302A includes a first order filter 310A and at least one second order filter 312A. As used herein, a second order filter is a second order circuit that includes two energy storage elements, such as a capacitor and an inductor (or any suitable combination thereof), and at least one resistor. The first order filter 310A is arranged in parallel with the second order filter 312A.

The first order filter 310A of the EMI shunt filter network 300 of FIG. 4 includes a first capacitor 341A, a first resistor 342A arranged in parallel with the capacitor 341A, and a second resistor 343A arranged in series with the first capacitor 341A and in parallel with the first resistor 342A. In some embodiments, the first resistor 342A has a first resistance R1 and the second resistor 343A has a second resistance R2, the first resistance R1 being different than the second resistance R2. Further, in some embodiments, the second resistance R2 is lower than the first resistance R1. In this regard, in such embodiments, the first resistor 342A has a higher resistance than the second resistor 343A.

The second order filter 312A includes a second capacitor 344A, an inductor 345A, and a third resistor 346A. The second capacitor 344A, the inductor 345A, and the third resistor 346A are arranged in series with one another. Thus, the second order filter 312A is a series RLC circuit. Notably, the resistance of the third resistor 346A, the inductance of the inductor 345A, and/or the capacitance of the second capacitor 344A can be selected so as to provide attenuation at or within a specific range of switching frequencies while passing other frequencies unaltered or substantially unaltered. For example, the elements of the second order filter 312A can be selected to provide attenuation at a switching frequency range of 40 to 50 kHz. As the second order filter 312A acts to attenuate a particular range of switching frequencies, the second order filter 312A can be said to be a notch filter.

Although only one second order filter 312A is shown in FIG. 4, the first EMI shunt filter 302A can include any suitable number of second order filters arranged in parallel with the first order filter 310A. For instance, in some embodiments, the first EMI shunt filter 302A can include a first range second order filter arranged and designed attenuate a first switching frequency range, a second range second order filter arranged and designed attenuate a second switching frequency range, and so on. In this regard, the first EMI shunt filter 302A can include N number of second order filters each arranged and designed attenuate a predetermined switching frequency range, wherein N is an integer greater than 1.0. In such embodiments, each one of the second order filters can be arranged in parallel with the first order filter 310A and each other.

As further shown in FIG. 4, the second EMI shunt filter 302B can be arranged in a similar manner as the first EMI shunt filter 302A. Particularly, for this embodiment, the second EMI shunt filter 302B includes a first order filter 310B and at least one second order filter 312B. The first order filter 310B is arranged in parallel with the second order filter 312B.

Particularly, the first order filter 310B of the second EMI shunt filter 300B of FIG. 4 includes a first capacitor 341B, a first resistor 342B arranged in parallel with the capacitor 341B, and a second resistor 343B arranged in series with the first capacitor 341B and in parallel with the first resistor 342B. In some embodiments, the first resistor 342B has a first resistance R1-B and the second resistor 343B has a second resistance R2-B, the first resistance R1-B being different than the second resistance R2-B. Further, in some embodiments, the second resistance R2-B is lower than the first resistance R1-B. In this regard, in such embodiments, the first resistor 342B has a higher resistance than the second resistor 343B.

The second order filter 312B includes a second capacitor 344B, an inductor 345B, and a third resistor 346B. The second capacitor 344B, the inductor 345B, and the third resistor 346B are arranged in series with one another. Thus, the second order filter 312B is a series RLC circuit. Notably, the resistance of the third resistor 346B, the inductance of the inductor 345B, and/or the capacitance of the second capacitor 344B can be selected so as to provide attenuation at or within a specific range of switching frequencies while passing other frequencies unaltered or substantially unaltered. For example, the elements of the second order filter 312B can be selected to provide attenuation at the switching frequency range provided by the elements of the second order filter 312A. As the second order filter 312B acts to attenuate a particular range of switching frequencies, the second order filter 312B can be said to be a notch filter. Like the second order filter 312A, the second order filter 312B of the second EMI shunt filter 302B can include any suitable number of second order filters arranged in parallel with the first order filter 310B.

Figure 5:
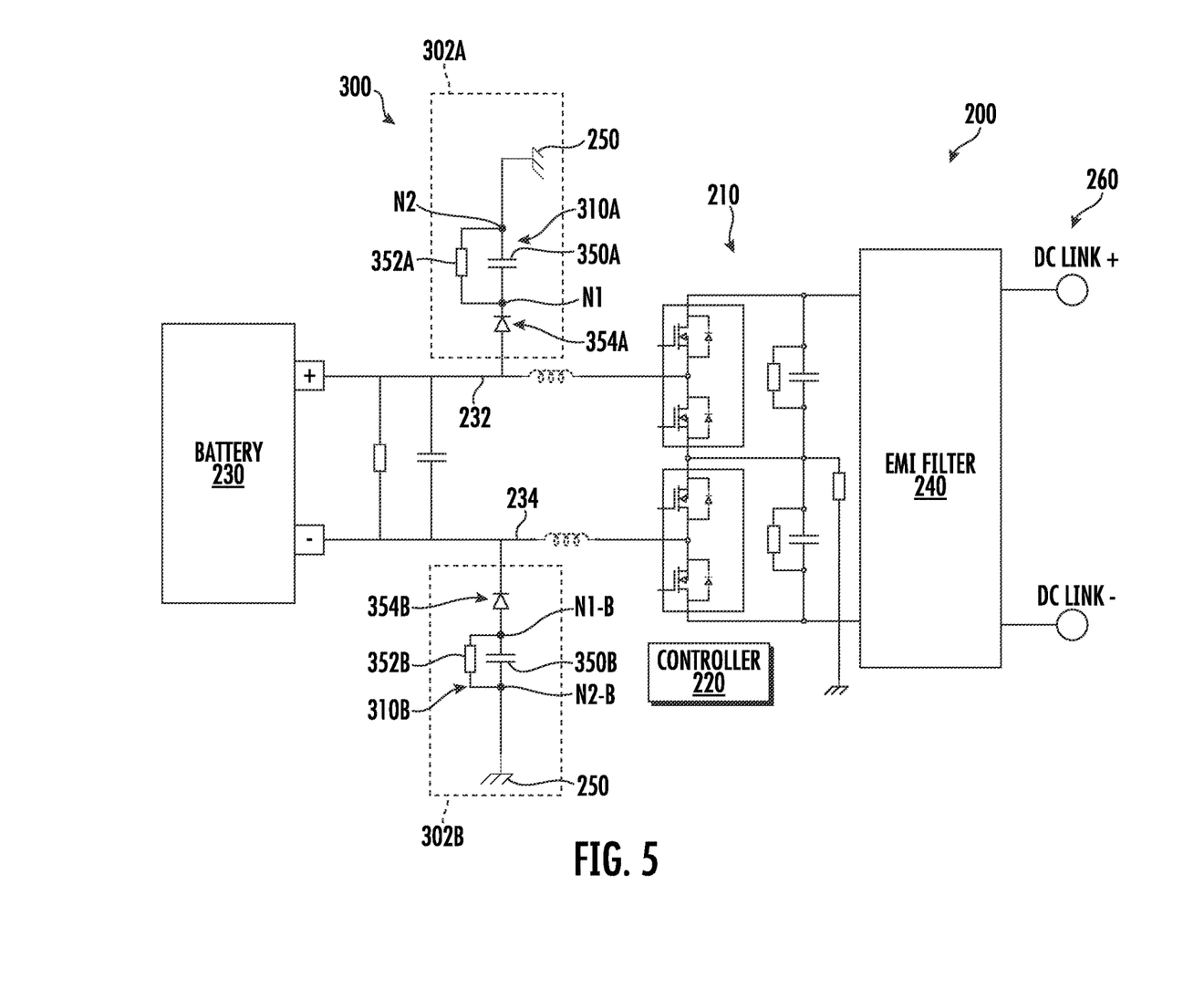
FIG. 5 provides a system diagram of an example power system according to yet another exemplary embodiment of the present disclosure.

FIG. 5 provides a system diagram of a power system 200 according to another exemplary embodiment of the present disclosure. The power system 200 of FIG. 5 is configured in the same manner as the power system 200 of FIG. 2 except as provided below.

For this embodiment, the first EMI shunt filter 302A includes a first order filter 310A. The first order filter 310A includes a first capacitor 350A and a first resistor 352A arranged in parallel with the first capacitor 350A. In this regard, the first order filter 310A is a parallel RC circuit. The first capacitor 350A and the first resistor 352A are connected at a first node N1 and at a second node N2. The first node N1 is positioned on a terminal side of the first capacitor 350A and the second node N2 is positioned on a reference frame side of the first capacitor 350A.

The first EMI shunt filter 302A also includes a first diode 354A arranged in series with the first capacitor 350A and the first resistor 352A. The first diode 354A is positioned between the first node N1 and the first terminal 232. Notably, the first diode 354A is arranged to block electric current from flowing from the reference frame 250 to the first terminal 232.

The second EMI shunt filter 302B of the EMI shunt filter network 300 of FIG. 5 is configured in a similar manner as the first EMI shunt filter 302A. Particularly, the second EMI shunt filter 302B includes a first order filter 310B. The first order filter 310B includes a second capacitor 350B and a second resistor 352B arranged in parallel with the second capacitor 350B. In this regard, the first order filter 310B is a parallel RC circuit. The second capacitor 350B and the second resistor 352B are connected at a first node N1-B and at a second node N2-B. The first node N1-B is positioned on a terminal side of the second capacitor 350B and the second node N2-B is positioned on a reference frame side of the second capacitor 350B.

The second EMI shunt filter 302B also includes a second diode 354B arranged in series with the second capacitor 350B and the second resistor 352B. The second diode 354B is positioned between the first node N1-B and the second terminal 234. Notably, the second diode 354B is arranged to block electric current from flowing from the second terminal 234 to the reference frame 250.

Notably, by arranging the first diode 354A in series with the first order filter 310A, which includes the first capacitor 350A and the first resistor 352A arranged in parallel with one another for this embodiment, the first diode 354A only conducts when the common mode voltage of the first terminal 232 exceeds the voltage across the first capacitor 350A. Likewise, by arranging the second diode 354B in series with the first order filter 310B, which includes the second capacitor 350B and the second resistor 352B arranged in parallel with one another for this embodiment, the second diode 354B only conducts when the common mode voltage of the second terminal 234 exceeds the voltage across the second capacitor 350B. In this regard, the common mode voltage associated with the first and second terminals 232, 234 can be clamped respectively to the voltage across the first and second capacitors 350A, 350B. Moreover, because the first and second diodes 354A, 354B only conduct when the common mode voltage associated with the first and second terminals 232, 234 exceeds their respective first and second capacitors 350A, 350B, power losses associated with the first and second EMI shunt filters 302A, 302B can be reduced.

Figure 6:
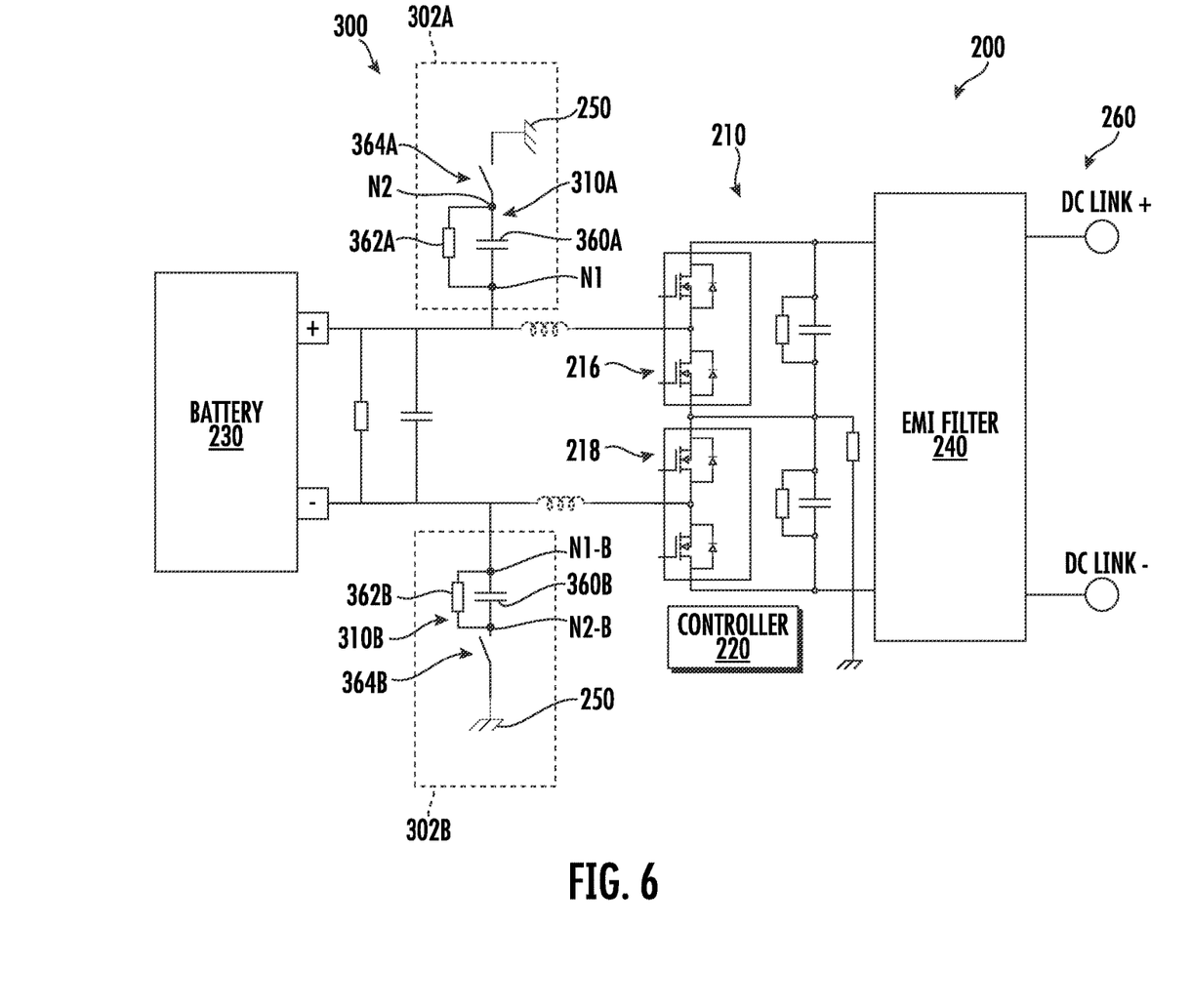
FIG. 6 provides a system diagram of an example power system according to another further exemplary embodiment of the present disclosure.

FIG. 6 provides a system diagram of a power system 200 according to another exemplary embodiment of the present disclosure. The power system 200 of FIG. 6 is configured in the same manner as the power system 200 of FIG. 2 except as provided below.

As depicted in FIG. 6, for this embodiment, the first EMI shunt filter 302A includes a first order filter 310A that includes a capacitor 360A and a resistor 362A arranged in parallel with the capacitor 360A. In this regard, the first order filter 310A is a parallel RC circuit. The capacitor 360A and the resistor 362A are connected at a first node N1 and at a second node N2. The first node N1 is positioned on a terminal side of the capacitor 360A and the second node N2 is positioned on a reference frame side of the capacitor 360A.

The first EMI shunt filter 302A also includes an active element or switching device 364A arranged in series with the capacitor 360A and the first resistor 362A. The switching device 364A is positioned between the second node N2 and the reference frame 250. The switching device 364A is operable to switch between an open position and a closed position. Generally, switching or modulating the switching device 364A open and closed at a predetermined switching frequency can control the impedance through the first EMI shunt filter 302A.

In some embodiments, one or more processors of the power system 200, such as one or more processors of the controller 220, can be configured to control modulation of the switching device 364A. The one or more processors can be communicatively coupled with the switching device 364A. Specifically, in some embodiments, the one or more processors can modulate the switching device 364A at a predetermined switching frequency to attenuate a common mode emission for a predetermined frequency range. The common mode emission can be a common mode voltage and/or current noise, for example. In this way, the switching device 364A can be used to modulate the impedance through the first EMI shunt filter 302A for a common mode emission for a predetermined frequency range, thereby providing flexible attenuation control. In some embodiments, the one or more processors can modulate the switching device 364A at a predetermined switching frequency to attenuate a common mode emission at various predetermined frequency ranges.

As further shown in FIG. 6, for this embodiment, the second EMI shunt filter 302B is configured in a similar manner as the first EMI shunt filter 302A of the EMI shunt filter network 300 of FIG. 6. Particularly, the second EMI shunt filter 302B includes a first order filter 310A that includes a capacitor 360B and a resistor 362B arranged in parallel with the capacitor 360B. In this regard, the first order filter 310A is a parallel RC circuit. The capacitor 360B and the resistor 362B are connected at a first node N1-B and at a second node N2-B. The first node N1-B is positioned on a terminal side of the capacitor 360B and the second node N2-B is positioned on a reference frame side of the capacitor 360B.

The second EMI shunt filter 302B also includes an active element or switching device 364B arranged in series with the capacitor 360B and the first resistor 362B. The switching device 364B is positioned between the second node N2-B and the reference frame 250. The switching device 364B is operable to switch between an open position and a closed position. Generally, switching or modulating the switching device 364B open and closed at a predetermined switching frequency can control the impedance through the second EMI shunt filter 302B.

In some embodiments, one or more processors of the power system 200, such as one or more processors of the controller 220, can be configured to control modulation of the switching device 364B. The one or more processors can be communicatively coupled with the switching device 364B, e.g., via a suitable wired and/or wireless connection link. Specifically, in some embodiments, the one or more processors can modulate the switching device 364B at a predetermined switching frequency to attenuate a common mode emission for a predetermined frequency range. The common mode emission can be a common mode voltage and/or current noise, for example. In this way, the switching device 364B can be used to modulate the impedance through the second EMI shunt filter 302B for a common mode emission for a predetermined frequency range, thereby providing flexible attenuation control. In some embodiments, the one or more processors can modulate the switching device 364B at a predetermined switching frequency to attenuate a common mode emission at various predetermined frequency ranges.

In some embodiments, the switching devices 364A, 364B can be modulated at the same predetermined switching frequency. In yet other embodiments, the switching devices 364A, 364B can be controlled to switch at different frequencies. For instance, the switching device 364A can be switched at a first predetermined frequency and the switching device 364B can be switched at a second predetermined frequency that is different than the first predetermined frequency.

Although each embodiment described above and depicted in FIGS. 2 through 6 includes an EMI filter network with a first EMI shunt filter and a second EMI filter having the same configuration, embodiments are contemplated where the first EMI shunt filter has a different configuration than the second EMI filter. For instance, in some embodiments, the first EMI filter can be configured as shown in FIG. 2, and the second EMI shunt filter can be configured as shown in FIG. 3, or FIG. 4, or FIG. 5, or FIG. 6. In some other embodiments, the first EMI filter can be configured as shown in FIG. 3, and the second EMI shunt filter can be configured as shown in FIG. 2, or FIG. 4, or FIG. 5, or FIG. 6. In some further embodiments, the first EMI filter can be configured as shown in FIG. 4, and the second EMI shunt filter can be configured as shown in FIG. 2, or FIG. 3, or FIG. 5, or FIG. 6. In yet other embodiments, the first EMI filter can be configured as shown in FIG. 5, and the second EMI shunt filter can be configured as shown in FIG. 2, or FIG. 3, or FIG. 4, or FIG. 6. In some other embodiments, the first EMI filter can be configured as shown in FIG. 6, and the second EMI shunt filter can be configured as shown in FIG. 2, or FIG. 3, or FIG. 4, or FIG. 5. In this regard, any suitable combination of EMI shunt filters can be utilized.

Figure 7:
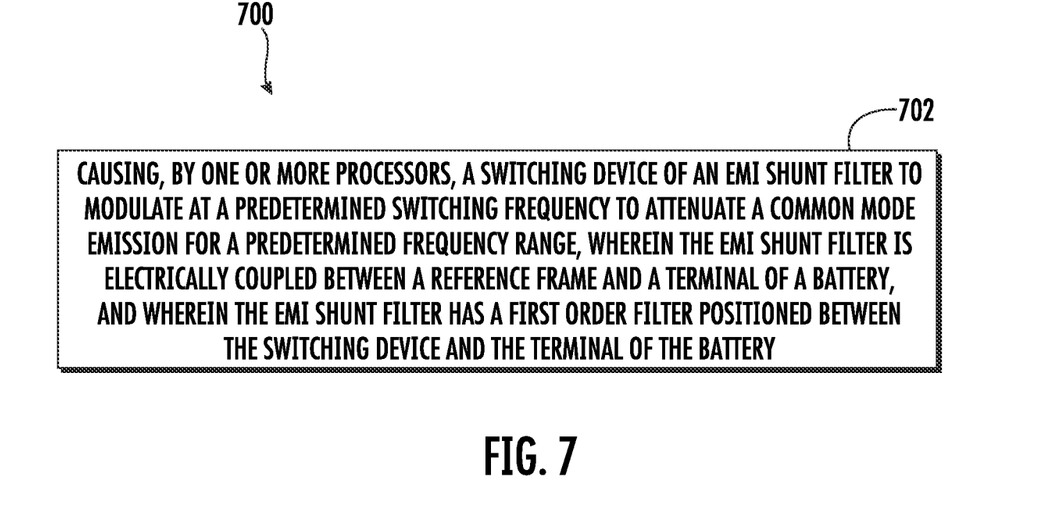
FIG. 7 provides a flow diagram for a method of reducing common mode noise in a power system according to one example embodiment.

FIG. 7 provides a flow diagram for a method 700 of reducing common mode noise in a power system according to one example embodiment. The method 700 can be implemented by one or more features of the power system 200 of FIG. 6, for example.

At 702, the method 700 includes causing, by one or more processors, a switching device of an EMI shunt filter to modulate at a predetermined switching frequency to attenuate a common mode emission for a predetermined frequency range, wherein the EMI shunt filter is electrically coupled between a reference frame and a terminal of a battery, and wherein the EMI shunt filter has a first order filter positioned between the switching device and the terminal of the battery. As noted above, modulating the switching device of the EMI shunt filter can control the impedance of the EMI shunt filter, thereby providing flexible attenuation control of common mode voltage and electric current noise.

Further, in some implementations, the one or more processors can modulate the switching device at a predetermined switching frequency to attenuate a common mode emission at various predetermined frequency ranges. For instance, the one or more processors can modulate the switching device at a first predetermined switching frequency to attenuate a common mode emission at a first predetermined frequency range, can modulate the switching device at a second predetermined switching frequency to attenuate a common mode emission at a second predetermined frequency range, and so on.

Figure 8:
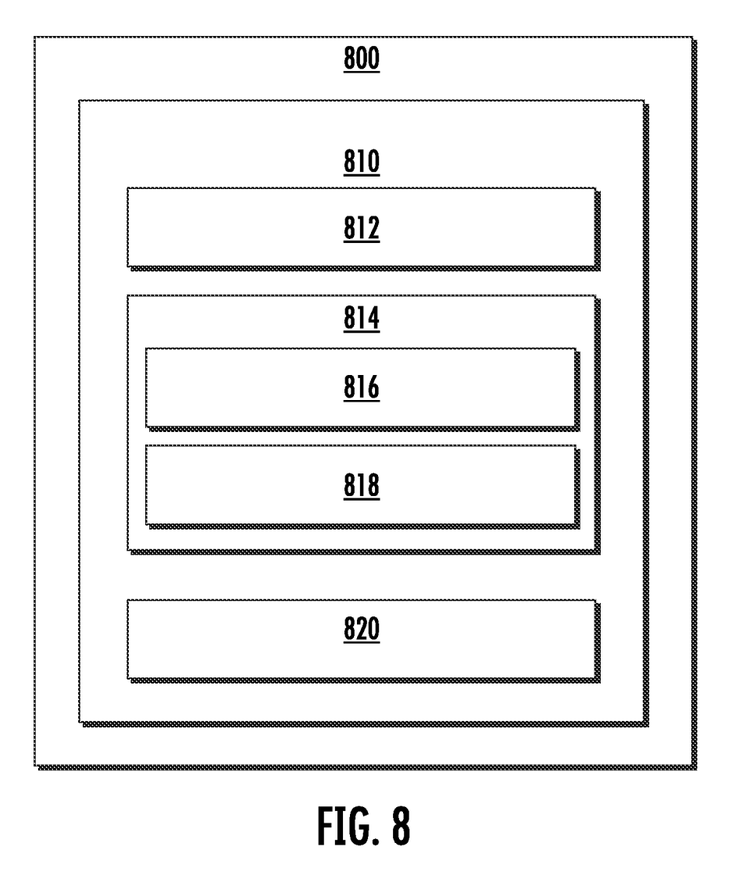
FIG. 8 provides an example computing system according to example embodiments of the present disclosure.

FIG. 8 provides an example computing system 800 according to example embodiments of the present disclosure. The computing devices or elements described herein, such as the supervisor controller 188, the controller 220, etc., may include various components and perform various functions of the computing system 800 described below, for example.

As shown in FIG. 8, the computing system 800 can include one or more computing device(s) 810. The computing device(s) 810 can include one or more processor(s) 812 and one or more memory device(s) 814. The one or more processor(s) 812 can include any suitable processing device, such as a microprocessor, microcontroller, integrated circuit, logic device, and/or other suitable processing device. The one or more memory device(s) 814 can include one or more computer-executable or computer-readable media, including, but not limited to, non-transitory computer-readable media, RAM, ROM, hard drives, flash drives, and/or other memory devices.

The one or more memory device(s) 814 can store information accessible by the one or more processor(s) 812, including computer-readable instructions 816 that can be executed by the one or more processor(s) 812. The instructions 816 can be any set of instructions that when executed by the one or more processor(s) 812, cause the one or more processor(s) 812 to perform operations. In some embodiments, the instructions 816 can be executed by the one or more processor(s) 812 to cause the one or more processor(s) 812 to perform operations, such as any of the operations and functions for which the computing system 800 and/or the computing device(s) 810 are configured, such as controlling operation of electrical power systems. The instructions 816 can be software written in any suitable programming language or can be implemented in hardware. Additionally, and/or alternatively, the instructions 816 can be executed in logically and/or virtually separate threads on processor(s) 812. The memory device(s) 814 can further store data 818 that can be accessed by the processor(s) 812. For example, the data 818 can include models, lookup tables, databases, etc.

The computing device(s) 810 can also include a network interface 820 used to communicate, for example, with the other components of system 800 (e.g., via a communication network). The network interface 820 can include any suitable components for interfacing with one or more network(s), including for example, transmitters, receivers, ports, controllers, antennas, and/or other suitable components. One or more devices can be configured to receive one or more commands from the computing device(s) 810 or provide one or more commands to the computing device(s) 810.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A system, comprising: a multi-level DC/DC converter; a battery having a terminal, the battery being electrically coupled with the multi-level DC/DC converter; a reference frame; and an electromagnetic interface (EMI) shunt filter electrically coupled between the terminal of the battery and the reference frame, the EMI shunt filter including at least one of a first order filter and a second order filter.
2. The system of any preceding clause, wherein the EMI shunt filter includes the first order filter.
3. The system of any preceding clause, wherein the first order filter comprises: a capacitor; a first resistor arranged in parallel with the capacitor; and a second resistor arranged in series with the capacitor and in parallel with the first resistor.
4. The system of any preceding clause, wherein the first resistor has a first resistance and the second resistor has a second resistance, the first resistance being different than the second resistance.
5. The system of any preceding clause, wherein the second resistance is lower than the first resistance.
6. The system of any preceding clause, wherein the first order filter comprises: a capacitor; a first resistor arranged in parallel with the capacitor; and a second resistor arranged in series with the capacitor and in series with the first resistor.
7. The system of any preceding clause, wherein the EMI shunt filter includes the first order filter and the second order filter.
8. The system of any preceding clause, wherein the first order filter is arranged in parallel with the second order filter.
9. The system of any preceding clause, wherein the second order filter comprises: a capacitor; an inductor; and a resistor, the capacitor, the inductor, and the resistor being arranged in series with one another.
10. The system of any preceding clause, wherein the EMI shunt filter includes the first order filter, and wherein the first order filter comprises: a capacitor; a resistor arranged in parallel with the capacitor; and a switching device arranged in series with the capacitor and the resistor.
11. The system of any preceding clause, wherein the capacitor and the resistor are connected at a first node and at a second node, the first node being positioned on a terminal side of the capacitor and the second node being positioned on a reference frame side of the capacitor, and wherein the switching device is positioned between the second node and the reference frame.
12. The system of any preceding clause, further comprising: one or more processors being configured to: modulate the switching device at a predetermined switching frequency to attenuate a common mode emission for a predetermined frequency range.
13. The system of any preceding clause, wherein the terminal is a first terminal, the battery has a second terminal, and the EMI shunt filter is a first EMI shunt filter, and wherein the system further includes a second EMI shunt filter electrically coupled between the second terminal of the battery and the reference frame, the second EMI shunt filter including at least one of a first order filter and a second order filter.

14. The system of any preceding clause, wherein the first EMI shunt filter includes the first order filter, and wherein the first order filter of the first EMI shunt filter comprises: a first capacitor; a first resistor arranged in parallel with the first capacitor; and a first diode arranged in series with the first capacitor and the first resistor, the first diode being arranged to block electric current from flowing from the reference frame to the first terminal.

15. The system of any preceding clause, wherein the second EMI shunt filter includes the first order filter, and wherein the first order filter of the second EMI shunt filter comprises: a second capacitor; a second resistor arranged in parallel with the second capacitor; and a second diode arranged in series with the second capacitor and the second resistor, the second diode being arranged to block electric current from flowing from the second terminal to the reference frame.

16. The system of any preceding clause, wherein the multi-level DC/DC converter is a non-split link multi-level DC/DC converter.

17. A system, comprising: a multi-level DC/DC converter; a battery having a terminal, the battery being electrically coupled with the multi-level DC/DC converter; a reference frame; and an electromagnetic interface (EMI) shunt filter electrically coupled between the terminal of the battery and the reference frame, the EMI shunt filter including a first order filter and a second order filter arranged in parallel with one another.

18. The system of any preceding clause, wherein the first order filter comprises: a capacitor; a first resistor arranged in parallel with the capacitor; and a second resistor arranged in series with the capacitor and in parallel with the first resistor.

19. The system of any preceding clause, wherein the second order filter comprises: a capacitor; an inductor; and a resistor, the capacitor, the inductor, and the resistor being arranged in series with one another.

20. A system, comprising: a multi-level DC/DC converter having switching devices; a battery having a terminal, the battery being electrically coupled with the multi-level DC/DC converter; a reference frame; one or more processors; and an electromagnetic interface (EMI) shunt filter electrically coupled between the terminal of the battery and the reference frame, the EMI shunt filter including a first order filter comprising: a capacitor; a resistor arranged in parallel with the capacitor; and a switching device arranged in series with the capacitor and the resistor, and wherein the one or more processors are configured to: modulate the switching device at a predetermined switching frequency to attenuate a common mode emission for a predetermined frequency range.

What is claimed is:

1. A system, comprising:
a multi-level DC/DC converter;
a battery having a first terminal and a second terminal, the battery being electrically coupled with the multi-level DC/DC converter;
a reference frame;
a first electromagnetic interface (EMI) shunt filter electrically coupled between the first terminal of the battery and the reference frame, the first EMI shunt filter including at least one of a first order filter and a second order filter; and
a second EMI shunt filter electrically coupled between the second terminal of the battery and the reference frame, the second EMI shunt filter including at least one of a first order filter and a second order filter.

2. The system of claim 1, wherein the first EMI shunt filter includes the first order filter.

3. The system of claim 2, wherein the first order filter comprises:
a capacitor;
a first resistor arranged in parallel with the capacitor; and
a second resistor arranged in series with the capacitor and in parallel with the first resistor.

4. The system of claim 3, wherein the first resistor has a first resistance and the second resistor has a second resistance, the first resistance being different than the second resistance.

5. The system of claim 4, wherein the second resistance is lower than the first resistance.

6. The system of claim 2, wherein the first order filter comprises:
a capacitor;
a first resistor arranged in parallel with the capacitor; and
a second resistor arranged in series with the capacitor and in series with the first resistor.

7. The system of claim 1, wherein the first EMI shunt filter includes the first order filter and the second order filter.

8. The system of claim 7, wherein the first order filter is arranged in parallel with the second order filter.

9. The system of claim 7, wherein the second order filter comprises:
a capacitor;
an inductor; and
a resistor, the capacitor, the inductor, and the resistor being arranged in series with one another.

10. The system of claim 1, wherein the first EMI shunt filter includes the first order filter, and wherein the first order filter comprises:
a capacitor;
a resistor arranged in parallel with the capacitor; and
a switching device arranged in series with the capacitor and the resistor.

11. The system of claim 10, wherein the capacitor and the resistor are connected at a first node and at a second node, the first node being positioned on a terminal side of the capacitor and the second node being positioned on a reference frame side of the capacitor, and wherein the switching device is positioned between the second node and the reference frame.

12. The system of claim 10, further comprising:
one or more processors being configured to:
modulate the switching device at a predetermined switching frequency to attenuate a common mode emission for a predetermined frequency range.

13. The system of claim 1, wherein the first EMI shunt filter includes the first order filter, and wherein the first order filter of the first EMI shunt filter comprises:
a first capacitor;
a first resistor arranged in parallel with the first capacitor; and
a first diode arranged in series with the first capacitor and the first resistor, the first diode being arranged to block electric current from flowing from the reference frame to the first terminal.

14. The system of claim 13, wherein the second EMI shunt filter includes the first order filter, and wherein the first order filter of the second EMI shunt filter comprises:
- a second capacitor;
- a second resistor arranged in parallel with the second capacitor; and
- a second diode arranged in series with the second capacitor and the second resistor, the second diode being arranged to block electric current from flowing from the second terminal to the reference frame.

15. The system of claim 1, wherein the multi-level DC/DC converter is a non-split link multi-level DC/DC converter.

16. A system, comprising:
- a multi-level DC/DC converter;
- a battery having a first terminal and a second terminal, the battery being electrically coupled with the multi-level DC/DC converter;
- a reference frame;
- a first electromagnetic interface (EMI) shunt filter electrically coupled between the first terminal of the battery and the reference frame, the first EMI shunt filter including a first order filter and a second order filter arranged in parallel with one another; and
- a second EMI shunt filter electrically coupled between the second terminal of the battery and the reference frame, the second EMI shunt filter including a first order filter and a second order filter arranged in parallel with one another.

17. The system of claim 16, wherein the first order filter comprises:
- a capacitor;
- a first resistor arranged in parallel with the capacitor; and
- a second resistor arranged in series with the capacitor and in parallel with the first resistor.

18. The system of claim 16, wherein the second order filter comprises:
- a capacitor;
- an inductor; and
- a resistor, the capacitor, the inductor, and the resistor being arranged in series with one another.

19. A system, comprising:
- a multi-level DC/DC converter having switching devices;
- a battery having a terminal, the battery being electrically coupled with the multi-level DC/DC converter;
- a reference frame;
- one or more processors; and
- an electromagnetic interface (EMI) shunt filter electrically coupled between the terminal of the battery and the reference frame, the EMI shunt filter including a first order filter comprising:
  - a capacitor;
  - a resistor arranged in parallel with the capacitor; and
  - a switching device arranged in series with the capacitor and the resistor, and
- wherein the one or more processors are configured to:
  - modulate the switching device at a predetermined switching frequency to attenuate a common mode emission for a predetermined frequency range.

* * * * *